US012697703B2

(12) United States Patent
Schuller et al.

(10) Patent No.: US 12,697,703 B2
(45) Date of Patent: Aug. 4, 2026

(54) HAND-HELD POWER TOOL

(71) Applicant: Robert Bosch GmbH, Stuttgart (DE)

(72) Inventors: Marcus Schuller, Dettenhausen (DE); Rainer Britz, Schorndorf (DE); Simon Erbele, Nufringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/721,831

(22) PCT Filed: Dec. 9, 2022

(86) PCT No.: PCT/EP2022/085168
§ 371 (c)(1),
(2) Date: Jun. 19, 2024

(87) PCT Pub. No.: WO2023/117486
PCT Pub. Date: Jun. 29, 2023

(65) Prior Publication Data

US 2024/0351172 A1 Oct. 24, 2024

(30) Foreign Application Priority Data

Dec. 22, 2021 (DE) ..................... 10 2021 214 868.9

(51) Int. Cl.
*B25B 21/02* (2006.01)
*B25F 5/00* (2006.01)

(52) U.S. Cl.
CPC ............ *B25B 21/023* (2013.01); *B25F 5/001* (2013.01)

(58) Field of Classification Search
CPC ........ B25B 21/02; B25B 21/023; B25F 5/001
See application file for complete search history.

(56) References Cited

U.S. PATENT DOCUMENTS

| | | | | |
|---|---|---|---|---|
| 7,168,503 | B1 | 1/2007 | Teng | |
| 2018/0272510 | A1* | 9/2018 | Muramatsu | B25B 21/026 |
| 2023/0043704 | A1* | 2/2023 | Kondo | B25B 21/02 |

FOREIGN PATENT DOCUMENTS

| | | | |
|---|---|---|---|
| DE | 43 01 610 | A1 | 8/1994 |
| DE | 10 2010 029 559 | A1 | 12/2011 |
| DE | 10 2013 208 900 | A1 | 11/2014 |
| EP | 2140976 | A1 | 1/2010 |
| EP | 2140978 | A1 | 1/2010 |

OTHER PUBLICATIONS

International Search Report corresponding to PCT Application No. PCT/EP2022/085168, mailed Mar. 31, 2023. (German and English language document). (5 pages).

* cited by examiner

*Primary Examiner* — Daniel Jeremy Leeds
(74) *Attorney, Agent, or Firm* — Maginot, Moore & Beck LLP

(57) ABSTRACT

A hand-held power tool includes a housing, a drive motor, an intermediate shaft that can be driven by the drive motor, and a percussion mechanism. The percussion mechanism has a striker and at least one percussion mechanism spring which is connected to the striker in a rotationally fixed manner, and the percussion mechanism can be driven at least in part by the intermediate shaft. The hand-held power tool further includes a tool holder, which is configured for holding an insert tool, and can be driven by means of the percussion mechanism, in particular the striker and/or the intermediate shaft. The intermediate shaft includes at least one bearing, and the percussion mechanism spring is connected to the bearing in a rotationally fixed manner.

13 Claims, 9 Drawing Sheets

HAND-HELD POWER TOOL

This application is a 35 U.S.C. § 371 National Stage Application of PCT/EP2022/085168, filed on Dec. 9, 2022, which claims the benefit of priority to Serial No. DE 10 2021 214 868.9, filed on Dec. 22, 2021 in Germany, the disclosures of which is incorporated herein by reference in its entirety.

The present disclosure relates to a hand-held power tool.

BACKGROUND

EP 2 140 978 A1 discloses an impact wrench comprising a drive motor for driving a drive shaft and an output shaft that can be coupled to a tool holder, as well as a percussion mechanism.

SUMMARY

The present disclosure relates to a hand-held power tool having a housing, having a drive motor, having an intermediate shaft, wherein the intermediate shaft can be driven by the drive motor, having a percussion mechanism comprising a striker and at least one percussion mechanism spring which is connected to the striker in a rotationally fixed manner, wherein the percussion mechanism can be driven at least in part by the intermediate shaft, and having a tool holder for holding an insert tool, wherein the tool holder can be driven by means of the percussion mechanism, in particular the striker and/or the intermediate shaft. It is proposed that the intermediate shaft comprises at least one bearing, wherein the percussion mechanism spring is connected to the bearing in a rotationally fixed manner.

The invention disclosure provides a hand-held power tool comprising a percussion mechanism which has a higher mass inertia as a result of the percussion mechanism spring being connected to the bearing in a rotationally fixed manner.

The hand-held power tool can be configured as an electrically operated hand-held power tool. The electrically operated hand-held power tool can be configured as a mains-operated or a cordless hand-held power tool. The hand-held power tool can be configured as a rotary impact screwdriver, for example.

The housing of the hand-held power tool is configured to at least partly accommodate the tool holder, the drive motor, the intermediate shaft and the percussion mechanism. The housing can be configured as a shell housing with two half shells.

The drive motor can be configured as an electrically commutated drive motor, in particular as at least one electric motor. The drive motor is configured such that it can be actuated via the manual switch. When the manual switch is actuated by a user, the drive motor is switched on and the hand-held power tool is put into operation. If the manual switch is not further actuated by the user, the drive motor is switched off. The drive motor can preferably be electronically controlled and/or regulated in such a way that a reversing mode and a specification for a desired rotational speed can be implemented. In reversing mode, the drive motor can be switched between a clockwise direction of rotation and a counterclockwise direction of rotation. To switch the drive motor in reversing mode, the hand-held power tool can comprise a rotation direction switching element, in particular a rotation direction changeover switch.

The drive motor can be configured to drive the intermediate shaft. For this purpose, the drive motor and the intermediate shaft are connected to one another. The intermediate shaft can be disposed between the drive motor and the tool holder. The intermediate shaft can comprise a gear unit. The gear unit can be configured as at least one planetary gear, in which case it can, for example, be shiftable. The planetary gear can comprise at least one planetary gear stage. In the case of a shiftable transmission, it is possible to switch between at least two gear stages by means of at least one gear shifting element, in particular a gear shifter. The gear unit can comprise a gear cover. The gear cover is configured to cover the gear unit with respect to the drive motor, in particular close it at least partly. The gear cover can be disposed between the planetary gear, in particular the planetary gear stage, and the drive motor. The gear unit, in particular the planetary gear, can comprise a ring gear. The ring gear and the gear cover can be one piece, for example.

The percussion mechanism is configured to be operated in a percussive operating mode. In the percussive operating mode, the percussion mechanism generates high torque peaks to loosen stuck connecting means or tighten connecting means. The percussion mechanism comprises the striker and the percussion mechanism spring which is connected to the striker in a rotationally fixed manner. The percussion mechanism can be connected to the drive motor by means of the gear unit of the intermediate shaft. The percussion mechanism can be configured as a percussion-rotation mechanism or a V-groove percussion mechanism, for example. The percussion mechanism can be driven by the intermediate shaft. The percussion mechanism can be disposed between the drive motor and the tool holder. The percussion mechanism comprises a percussion mechanism housing, in which the striker and the percussion mechanism spring are disposed. The percussion mechanism also comprises a percussion mechanism cover. The percussion mechanism cover can close off the percussion mechanism in the direction of the drive motor. The percussion mechanism cover can be disposed between the drive motor and the tool holder, in particular the intermediate shaft, very particularly the gear unit. It is possible for the percussion mechanism cover and the gear cover to be one piece, so that the percussion mechanism cover forms the ring gear.

The striker and the percussion mechanism spring can be disposed in circumferential direction around the intermediate shaft. The striker can be mounted on the intermediate shaft by means of percussion mechanism balls. The percussion mechanism balls are further configured to move the striker at least partly, in particular axially, in the direction of the drive motor. The striker can be disposed in a position facing the tool holder or in a position facing the drive motor. In the position facing the tool holder, the striker can rest against a rear end of the tool holder by means of at least one percussion cam. Two percussion cams are provided here, for example, but more than two percussion cams are conceivable too. In the position facing the drive motor, the striker can be disposed spaced apart from the tool holder. The percussion mechanism balls are configured to retract the percussion mechanism at a triggering torque that can be present at the tool holder, in that the percussion mechanism balls move, in particular displace, the striker from the position facing the tool holder against a spring force of the percussion mechanism spring to the position facing the drive motor. The spring force exerted by the percussion mechanism spring is stored in the percussion mechanism spring as performed tensioning work. As soon as the striker reaches the position facing the drive motor, the striker can be guided back to the position facing the tool holder by means of the percussion mechanism spring. This releases the performed tensioning work of the percussion mechanism spring, as a result of which the striker is guided to the position facing the tool holder. The striker can carry out a rotational movement and an axial movement. The percussion mechanism spring can, for instance, be configured as a spiral spring, a barrel-shaped spring, a conical spring, a chimney spring or a profiled spring.

The percussion mechanism spring is connected to the striker in a rotationally fixed manner. The percussion mechanism spring is then driven in rotation as soon as the striker rotates. The percussion mechanism spring can be connected to the striker in a form-locking, force-locking and/or material-locking manner. It is also conceivable that a plurality of percussion mechanism springs are provided.

The drive motor comprises a drive shaft. The drive shaft is mounted in the housing via at least one drive shaft bearing. The drive motor can drive the intermediate shaft, the gear unit, the percussion mechanism and/or the tool holder by means of the drive shaft. The drive shaft bearing can be configured as a ball bearing, a rolling bearing or a sliding bearing, for example. The drive shaft bearing is disposed at an end of the drive motor facing the tool holder. The drive shaft can project through the gear unit into the intermediate shaft. The drive shaft bearing can be disposed in the intermediate shaft so that the drive shaft is mounted in the intermediate shaft via the drive shaft bearing. The drive shaft can have a further drive shaft bearing that is disposed on an end facing away from the drive motor. The drive shaft can then be rotatably mounted in the housing via the drive shaft bearing and the further drive shaft bearing. It is possible for the drive shaft to project into the gear cover and/or engage in the gear cover. The hand-held power tool can have a tool axis. In this case, an axis of rotation of the drive shaft can form the tool axis. “Axial” is in particular intended to be understood as substantially parallel to the tool axis. Whereas “radial” is intended to be understood as substantially perpendicular to the tool axis.

The tool holder can be configured as an internal tool holder, for example a bit holder, and/or as an external tool holder, for example a socket holder. It is also conceivable that the tool holder is configured as a drill chuck. The tool holder can accommodate insert tools, such as screwdriver bits or sockets, so that a user can produce screw connections between a fastening element and a fastener holder.

The hand-held power tool further includes a power supply, wherein the power supply is provided for cordless operation by means of rechargeable batteries, in particular hand-held power tool rechargeable battery packs, and/or for mains operation. In a preferred embodiment, the power supply is configured for cordless operation. In the context of the present disclosure, a “hand-held power tool rechargeable battery pack” is intended to be understood as a combination of at least one battery cell and a rechargeable battery pack housing. The hand-held power tool rechargeable battery pack is advantageously configured for supplying power to commonly available cordless hand-held power tools. The at least one battery cell can, for instance, be configured as a Li-ion battery cell having a nominal voltage of 3.6 V. The hand-held power tool rechargeable battery pack can include up to ten battery cells, for example, although a different number of battery cells is conceivable too. Both an embodiment as a cordless hand-held power tool and operation as a mains-operated hand-held power tool are sufficiently well-known to those skilled in the art, so the specifics of the power supply will not be discussed here.

The hand-held power tool can comprise a control unit at least for controlling the drive motor. The control unit can be disposed in the housing, for example in a handle of the hand-held power tool or in a region of a power supply interface.

The intermediate shaft comprises the bearing to which the percussion mechanism spring is connected in a rotationally fixed manner. The percussion mechanism spring can be connected in a rotationally fixed manner to at least one element of the bearing. The percussion mechanism spring is connected to the bearing in such a way that the bearing rotates at least partly when the percussion mechanism spring rotates. This enables the percussion mechanism spring to rotate relative to the intermediate shaft by means of the at least one element of the bearing. The bearing can, for instance, be configured as a needle bearing, an axial needle bearing, a barrel-shaped bearing, a rolling bearing, a ball bearing or a radial ball bearing.

In one embodiment of the hand-held power tool, the intermediate shaft, in particular the gear unit, comprises at least one planet carrier, wherein the bearing is disposed between the percussion mechanism spring and the planet carrier. The intermediate shaft at least partly forms the gear unit. As described above, the gear unit can be configured as the planetary gear. The planetary gear comprises the planet carrier, at least a plurality of planet gears and bearing bolts, wherein the bearing bolts are configured to rotatably connect the planet gears to the planet carrier. The intermediate shaft can at least partly form the planetary gear. The intermediate shaft can at least partly form the planet carrier here, so that the intermediate shaft and the planet carrier are one piece. The bearing is disposed axially between the planet carrier and the percussion mechanism spring.

In one embodiment of the hand-held power tool, the bearing comprises a fastening element which is configured to connect the percussion mechanism spring to the bearing in a rotationally fixed manner. The fastening element can be connected to the bearing in a form-locking, force-locking and/or material-locking manner. It is possible for the bearing to form the fastening element so that they are one piece. The fastening element can be disposed in radial direction between the intermediate shaft and the striker or the percussion mechanism spring. The percussion mechanism spring rests against the fastening element. In this context, “resting against” is intended to be understood as being in direct and immediate contact. The fastening element is therefore in direct and immediate contact with the percussion mechanism spring. The fastening element enables a form-locking, force-locking and/or material-locking connection between the percussion mechanism spring and the bearing. It is possible for the percussion mechanism spring and the fastening element to be connected to one another by means of a press connection. The fastening element can be configured as an at least partly circumferential web, an at least partly circumferential collar, an at least partly circumferential projection, an at least partly circumferential flange or an at least partly circumferential leg. The percussion mechanism spring has an inner perimeter and an outer perimeter. The percussion mechanism spring can rest against the fastening element via the inner perimeter and/or the outer perimeter. The fastening element can therefore engage at least partly in the inner perimeter of the percussion mechanism spring and/or at least partly surround the outer perimeter of the percussion mechanism spring. It is conceivable that at least one further fastening element is provided, so that the percussion mechanism spring is engaged in its inner perimeter by the fastening element, for example, and is surrounded on its outer perimeter by the further fastening element.

In one embodiment of the hand-held power tool, the bearing comprises at least one stabilizing element, wherein the stabilizing element is configured to connect the fastening element to the bearing, in particular a bearing race of the bearing. The stabilizing element can in particular be disposed axially between the bearing, in particular the bearing race, and the fastening element. The stabilizing element can be disposed as a kind of arch between the fastening element and the bearing, in particular the bearing race. The stabilizing element can be formed as a kind of at least partly circumferential arch, a kind of at least partly circumferential dome, a kind of shell or a kind of at least partly circumferential ring, for example. The stabilizing element can be connected to the fastening element and the bearing, in particular the bearing race, in a form-locking, force-locking and/or material-locking manner. However, it is conceivable that the bearing, in particular the bearing race, forms the stabilizing element and the fastening element so that they are one piece.

In one embodiment of the hand-held power tool, the percussion mechanism spring rests against a bearing race of the bearing. The bearing comprises the bearing race and rolling elements. The percussion mechanism spring rests directly and immediately against the bearing race. The bearing race can be disposed in the percussion mechanism housing in the direction toward the tool holder. The bearing race can thus be disposed axially between the rolling elements and the percussion mechanism spring. The bearing race enables the percussion mechanism spring to rotate relative to the intermediate shaft, in particular the planet carrier, by means of the rolling elements. The bearing race can be substantially disk-shaped or ring-shaped. The bearing race can be configured in the form of a disk or a ring, for instance. The rolling elements of the bearing can be configured as balls, needles or rollers, for example. The bearing race has a side facing the percussion mechanism spring and a side facing the drive motor. The side of the bearing race facing the percussion mechanism spring can be substantially flat so that the percussion mechanism spring can rest against it. The side of the bearing race facing the drive motor can comprise at least one rolling element holder, wherein the rolling element holder is configured to accommodate and support the rolling elements of the bearing. The rolling element holder can be shaped complementarily to the rolling elements and can accommodate the rolling elements in a form-locking manner, for instance. The rolling element holder can be one piece with the bearing race, for example. The rolling element holder can be substantially flat, groove-shaped, cup-shaped, pot-shaped or shaft-shaped, for example. The fastening element can be connected to the bearing race by means of the stabilizing element. However, it is also conceivable that the fastening element is directly and immediately connected to the bearing race so that the fastening element is molded onto the bearing race.

In one embodiment, the planet carrier is at least partly configured as a bearing cover disk. The planet carrier and the bearing cover disk can be one piece. The bearing comprises the bearing race, the rolling elements and the bearing cover disk. The bearing cover disk can be disposed opposite the bearing race. The rolling elements can moreover be disposed between the bearing race and the bearing cover disk. The bearing cover disk can be disposed in the percussion mechanism housing in the direction toward the drive motor. The bearing cover disk can have a side facing the tool holder. The side of the bearing cover disk facing the tool holder can be disposed opposite the side of the bearing race facing the drive motor. The side of the bearing cover disk facing the tool holder can comprise a further rolling element holder. The further rolling element holder is configured to accommodate and support the rolling elements. The rolling elements can thus be accommodated and supported by the rolling element holder of the bearing race and the further rolling element holder of the bearing cover disk, so that the bearing race can be rotated relative to the bearing cover disk. The further rolling element holder can be shaped complementarily to the rolling elements and can accommodate the rolling elements in a form-locking manner, for instance. The further rolling element holder can be one piece with the bearing cover disk, for example. The further rolling element holder can be substantially flat, groove-shaped, cup-shaped, pot-shaped or shaft-shaped, for example. It is conceivable that the rolling element holder and the further rolling element holder can be configured in the same way or differently, depending on the rolling elements.

In one embodiment, the bearing comprises an outer ring against which the percussion mechanism spring rests. The percussion mechanism spring rests directly and immediately against the outer ring. The outer ring can be rotatable relative to the intermediate shaft, so that the percussion mechanism spring can be rotatable relative to the intermediate shaft. The percussion mechanism spring can therefore be rotationally fixed to the striker and rotatable with respect to the intermediate shaft. The bearing can be a ball bearing with rolling elements configured as balls, for example. The fastening element can be connected to the outer ring. It is also possible for the fastening element to be connected to the outer ring by means of the stabilizing element.

In one embodiment, the bearing comprises an inner ring against which the percussion mechanism spring rests. The percussion mechanism spring can rest directly and immediately against the inner ring. The inner ring can be rotatable relative to the intermediate shaft, so that the percussion mechanism spring can be rotatable relative to the intermediate shaft. The percussion mechanism spring can therefore be rotationally fixed to the striker and rotatable with respect to the intermediate shaft. The bearing can be a ball bearing with rolling elements configured as balls, for example. The bearing configured as a ball bearing can thus comprise the outer ring, the inner ring and the rolling element configured as balls, for example, wherein the balls are disposed radially between the inner ring and the outer ring. The fastening element can be connected to the inner ring. It is also possible for the fastening element to be connected to the inner ring by means of the stabilizing element.

In one embodiment of the hand-held power tool, the bearing includes at least one centering element, wherein the centering element is configured to center the bearing relative to the intermediate shaft. The bearing and the centering element can be connected to one another in a form-locking, force-locking and/or material-locking manner. It is also possible for the bearing to form the centering element so that they are one piece. It is conceivable that the bearing race forms the centering element. The centering element is configured to center the rolling elements of the bearing relative to the intermediate shaft, in particular the tool axis. The centering element is therefore configured to arrange and/or align the rolling elements relative to the intermediate shaft. The centering element aligns an axis of rotation of the bearing within a tolerance range to an axis of rotation of the intermediate shaft in such a way that the axis of rotation of the bearing and the axis of rotation of the intermediate shaft are substantially coaxial with one another. The centering element can be configured as an at least partly circumferential collar, an at least partly circumferential projection, an at least partly circumferential web, an at least partly circumferential flange or an at least partly circumferential edge, for example. The centering element is configured to at least partly surround the rolling elements in axial direction in order to radially secure the rolling elements. The centering element can be formed on an inner perimeter of the bearing, in particular the bearing race, or on an outer perimeter of the bearing, in particular the bearing race. If the centering element is formed on the inner perimeter of the bearing, in particular the bearing race, the centering element can be disposed radially between the tool axis and the rolling elements, in particular a direction of rotation of the rolling elements. If the centering element is formed on the outer perimeter of the bearing, in particular the bearing race, the centering element can be disposed radially between the percussion mechanism spring and the percussion mechanism housing. The fastening element and the centering element can be disposed and/or formed opposite to one another on the bearing, in particular the bearing race. It is therefore possible for the fastening element to be disposed on the inner perimeter of the bearing, in particular the bearing race, and the centering element to be disposed on the outer perimeter of the bearing, in particular the bearing race. It is also possible for the fastening element to be disposed on the inner perimeter of the bearing, in particular the bearing race, and the centering element to be disposed on the inner perimeter of the bearing, in particular the bearing race. It is moreover possible for the fastening element to be disposed on the outer perimeter of the bearing, in particular the bearing race, and the centering element to be disposed on the inner perimeter of the bearing, in particular the bearing race.

In one embodiment of the hand-held power tool, the bearing, in particular the bearing cover disk, comprises at least one retaining element which is configured to restrain the rolling elements of the bearing. The retaining element is configured to radially restrain the rolling elements. The bearing, in particular the bearing cover disk, and the retaining element can be connected to one another in a form-locking, force-locking and/or material-locking manner. It is also possible for the bearing to form the retaining element so that they are one piece. It is also possible for the bearing cover disk to form the retaining element. The intermediate shaft comprises the planet carrier and the planet carrier can form the bearing cover disk so that the planet carrier can form the retaining element. The retaining element can be configured as an at least partly circumferential edge, an at least partly circumferential step, an at least partly circumferential projection, an at least partly circumferential web, an at least partly circumferential flange or an at least partly circumferential shoulder, for example. The retaining element can be disposed radially between the tool axis and the rolling elements, in particular a direction of rotation of the rolling elements. The retaining element then prevents radial movement of the rolling elements in the direction of the tool axis. The retaining element can also be disposed radially between the rolling elements and the percussion mechanism housing. The retaining element prevents radial movement of the rolling elements in the direction of the percussion mechanism housing. The rolling elements of the bearing are disposed radially between the retaining element and the centering element.

In one embodiment, the striker comprises at least one spring receptacle and the percussion mechanism spring comprises at least one connecting element, wherein the spring receptacle is configured to at least receive the connecting element in a form-locking manner and connect it to the striker in a rotationally fixed manner. The striker has a free end directed in the direction of the tool holder and a free end directed in the direction of the drive motor. The percussion cam is disposed and/or formed on the free end directed in the direction of the tool holder. The percussion mechanism spring is disposed on the free end of the striker directed in the direction of the drive motor. On the free end directed in the direction of the drive motor, the striker has an inner perimeter. The spring receptacle is formed on the inner perimeter of the free end directed in the direction of the drive motor. The spring receptacle can be disposed on the striker in circumferential direction and axially to the percussion cam or offset to the percussion cams in circumferential direction. The striker and the spring receptacle can be connected to one another in a form-locking, force-locking and/or material-locking manner. It is also possible for the striker to form the spring receptacle so that they are one piece. The spring receptacle can be cylindrical, ring-shaped or polygonal, for example. The spring receptacle can also be configured as a recess, a keyhole type receptacle, an undercut, an inner flange, an outer flange, an opening, a shaft, a shell, a pot, a groove, or a groove with a web, with a collar, with a flange or with a shoulder.

The percussion mechanism spring and the connecting element can be connected to one another in a form-locking, force-locking and/or material-locking manner. It is conceivable that the percussion mechanism spring forms the connecting element so that they are one piece. The connecting element can be formed on a free end of the percussion mechanism spring in the direction toward the tool holder. The connecting element can be configured as an insertion end, for example, like a pin, like a tenon, like a leg, like a sleeve, Z-shaped, L-shaped, C-shaped, or V-shaped.

A connection between the connecting element and the spring receptacle is form-locking at least such that a rotation of the striker can be transmitted to the percussion mechanism spring and the percussion mechanism spring rotates with the striker. The connecting element and the spring receptacle can also be connected to one another in a force-locking and/or material-locking manner. It is possible for the connecting element and the spring receptacle to be connected to one another by means of a press fit. If the spring receptacle is configured in the form of a keyhole type receptacle, the connecting element can be threaded into the keyhole type receptacle. If the spring receptacle is configured in the form of an undercut, the connecting element can engage behind the undercut. If the spring receptacle is configured in the form of a flange, the percussion mechanism spring can be fixed to the flange by means of the connecting element.

In one embodiment, the spring receptacle is configured along the intermediate shaft in the striker. The spring receptacle can be configured and/or formed in the striker axially along the tool axis. The spring receptacle can be configured substantially parallel and radially offset to the intermediate shaft in the striker. If the spring receptacle is configured as a cylindrical opening, it can be configured substantially axially and parallel to the tool axis. The spring receptacle can be configured as an opening or the like in the direction of the tool holder. It is conceivable that the spring receptacle in the direction of the drive motor can be configured as a web, an edge, a collar, a flange or a shoulder, for example.

In one embodiment, the spring receptacle is configured transverse to the intermediate shaft in the striker. The spring receptacle can be configured in the striker transverse to the tool axis. The spring receptacle can be configured in a spring receptacle plane, wherein the spring receptacle plane can be configured in the striker transverse to the tool axis. If the spring receptacle is configured as a ring-shaped groove, the ring-shaped groove can be configured in the striker in circumferential direction to the tool axis, for example. The ring-shaped groove can be substantially concentric to the tool axis.

In one embodiment of the hand-held power tool, the percussion mechanism comprises at least one further percussion mechanism spring. It is possible for the further percussion mechanism spring to be connected to the striker in a rotationally fixed manner. The further percussion mechanism spring can then be connected to the striker in a manner similar to the striker as described above. A further spring receptacle can be provided and/or configured in the striker for the further percussion mechanism spring, wherein the further spring receptacle can be configured like the spring receptacle. The further percussion mechanism spring can also be configured like the percussion mechanism spring as described above. The percussion mechanism spring can have an inner perimeter and an outer perimeter. It is possible for the percussion mechanism spring to receive the further percussion mechanism spring on the inner perimeter, so that the percussion mechanism spring at least partly encloses the further percussion mechanism spring. It is also conceivable that the percussion mechanism spring receives the further percussion mechanism spring on the outer perimeter, so that the further percussion mechanism spring at least partly encloses the percussion mechanism spring. The percussion mechanism spring and the further percussion mechanism spring can be disposed coaxially, in particular substantially concentrically, in the percussion mechanism along the tool axis. The percussion mechanism spring and the further percussion mechanism spring can be disposed in the percussion mechanism housing in circumferential direction to the intermediate shaft. It is conceivable that the percussion mechanism spring and the further percussion mechanism spring are nested inside one another, so that the percussion mechanism spring holds the further percussion mechanism spring axially and fastens it to the striker. It is conceivable that a plurality of further percussion mechanism springs can be provided.

The spring receptacle and the further spring receptacle can be configured coaxially, in particular substantially concentrically, to one another in the striker. The spring receptacle and the further spring receptacle can be disposed and/or configured radially in the direction of the percussion mechanism housing. It is therefore possible for the spring receptacle and the further spring receptacle to be configured such that they are next to one another in radial direction. It is also possible for the spring receptacle and the further spring receptacle to be configured offset to one another in circumferential direction, for example in an angular range between 5° and 180°. It is conceivable that the spring receptacle and the further spring receptacle are separated from one another, for example by means of a web, a flange, a collar or a projection. The further percussion mechanism spring can be connected to the further spring receptacle in the same way as the percussion mechanism spring is connected to the spring receptacle. The further percussion mechanism spring can increase the mass inertia for the impact of the striker.

It is conceivable that the further percussion mechanism spring rests against the striker without being connected to it. It is also possible for the further percussion mechanism spring to rest against the bearing, in particular the bearing race, without being connected to it.

It is possible for the fastening element to engage in the inner perimeter of the percussion mechanism spring, so that the percussion mechanism spring rests against the fastening element via the inner perimeter of the percussion mechanism spring. The further percussion mechanism spring can be disposed inside the percussion mechanism spring or outside the percussion mechanism spring.

It is also possible for the fastening element to rest against the outer perimeter of the percussion mechanism spring, so that the percussion mechanism spring rests against the fastening element via the outer perimeter of the percussion mechanism spring. The further percussion mechanism spring can be disposed inside the percussion mechanism spring or outside the percussion mechanism spring. It is moreover possible for the fastening element to rest against an inner perimeter or outer perimeter of the further percussion mechanism spring.

In the case of the percussion mechanism spring and the further percussion mechanism spring, it is possible for the further fastening element to be provided in addition to the fastening element. The centering element can then be disposed on the inner perimeter of the bearing, in particular the bearing race, for example. The fastening element can then engage in the inner perimeter of the percussion mechanism spring and the further fastening element can surround the further percussion mechanism spring, for example.

In one embodiment of the hand-held power tool, the percussion mechanism spring has a winding direction and the further percussion mechanism spring has a further winding direction. The winding direction and the further winding direction can be the direction in which the percussion mechanism spring and the further percussion mechanism spring are wound. The winding direction and the further winding direction can be wound to the right or wound to the left, for example. The winding direction and the further winding direction can be wound the same, for instance, i.e. have the same winding direction, or can be wound differently, i.e. have different winding directions. The winding direction and the further winding direction can be combinations of right wound with right wound, left wound with left wound, or right wound with left wound, for instance.

In one embodiment of the hand-held power tool, the striker comprises a guide element and the bearing, in particular the bearing race, comprises a guide opening, wherein the guide element is configured to engage through the guide opening. The striker and the guide element can be connected to one another in a form-locking, force-locking and/or material-locking manner. It is possible for the striker to form the guide element so that the striker and the guide element are one piece. The guide element is configured to guide the striker on the intermediate shaft at least during the percussive operating mode. At least during the percussive operating mode, the striker can slide on the intermediate shaft by means of the guide element. The guide element can be disposed at least partly in circumferential direction around the intermediate shaft. The guide element can be configured as a sleeve, an at least partly circumferential web, as an at least partly circumferential collar or as an at least partly circumferential projection, for example. The bearing, in particular the bearing race, can form the guide opening. The guide opening can be configured as a central opening in the bearing. It is possible for the bearing race to form the guide opening. The rolling elements can moreover be movable, in particular rotatable, in circumferential direction around the guide opening. The guide opening can be circular, elliptical, or polygonal, for example. When the percussion mechanism is in the percussive operating mode, the striker is pulled up in the direction of the drive motor. The guide element engages through the guide opening, so that the guide element is prevented from striking the bearing and/or the planet carrier. When the striker is disposed in the position facing the drive motor, the guide element engages through the guide opening. The guide element and the guide opening can then periodically be substantially concentric.

In one embodiment of the hand-held power tool, the striker comprises a projecting element which is configured to project at least partly beyond the bearing, in particular the bearing race, very particularly the bearing race and the rolling elements. The striker and the projecting element can be connected to one another in a form-locking, force-locking and/or material-locking manner. It is possible for the striker to form the projecting element so that they are one piece. The projecting element can be configured as an at least partly circumferential step or as an at least partly circumferential edge, for instance. The projecting element can project beyond the bearing, in particular the bearing race, very particularly the bearing race and the rolling elements, when the striker is disposed in the position facing the drive motor. When the striker is pulled up in the direction of the drive motor during the percussive operating mode, the projecting element can at least partly surround the bearing, in particular the bearing race, very particularly the bearing race and the rolling elements, without resting against them. When the striker is disposed in the position facing the drive motor, the bearing and the projecting element are spaced apart from one another, in particular radially. This prevents the striker from striking the bearing during the percussive operating mode.

BRIEF DESCRIPTION OF THE DRAWINGS

The disclosure is explained in the following with reference to preferred embodiments. In the following, the drawings show.

DETAILED DESCRIPTION

Figure 1:
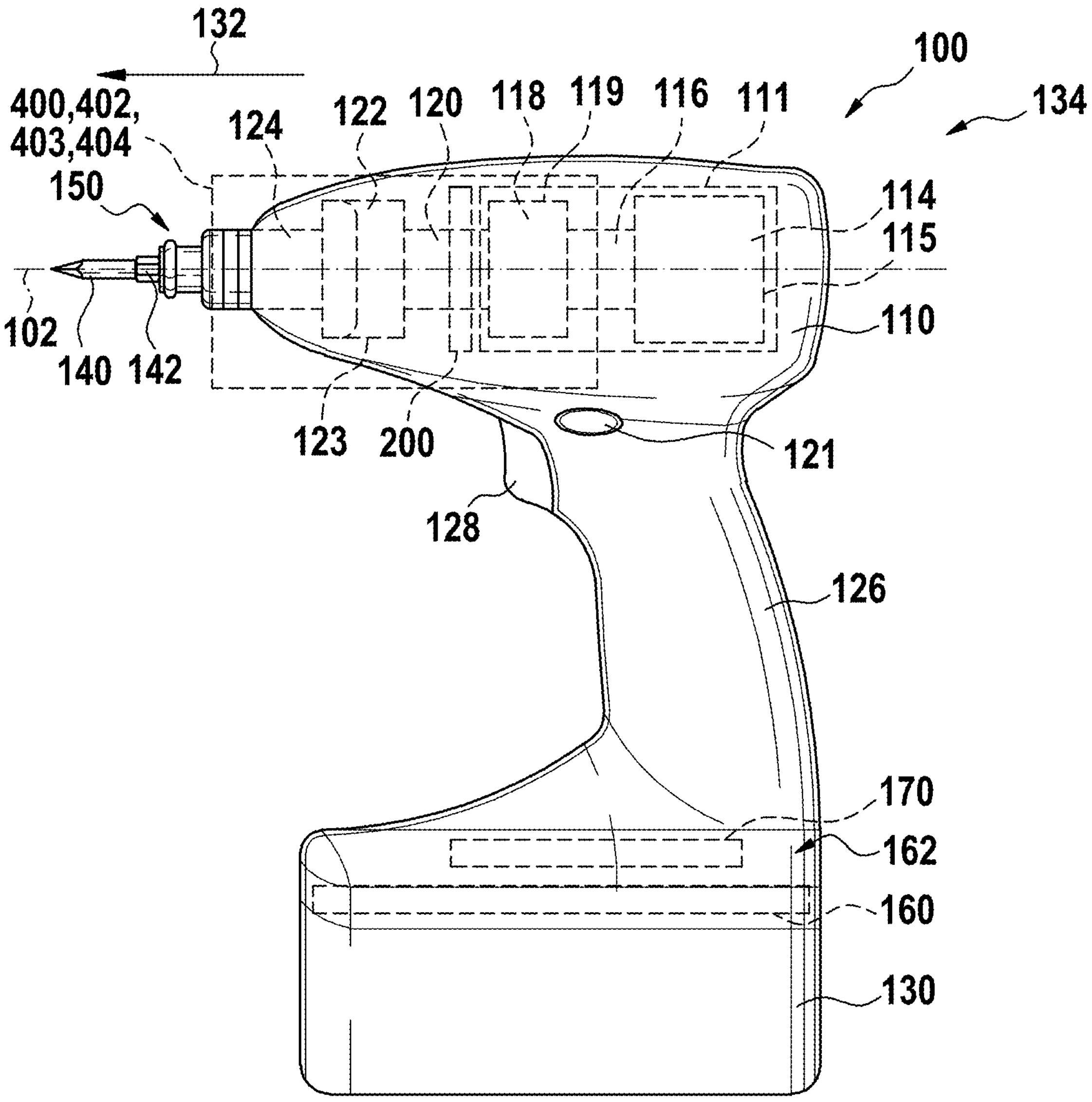
FIG. 1 a schematic view of a hand-held power tool according to the disclosure.

FIG. 1 shows a hand-held power tool 100 according to the disclosure, wherein it is configured here as a cordless rotary impact screwdriver, for example. The hand-held power tool 100 comprises an output shaft 124, a tool holder 150 and a percussion mechanism 122, e.g. a rotary percussion mechanism or percussion-rotation mechanism. The hand-held power tool 100 comprises a housing 110 with a handle 126. To provide a mains-independent power supply, the hand-held power tool 100 can be mechanically and electrically connected to a power supply for cordless operation, so that the hand-held power tool 100 is configured as a cordless hand-held power tool 100. A hand-held power tool rechargeable battery pack 130 is used here as the power supply. The present disclosure is not limited to cordless hand-held power tools, however, but can also be used for mains-dependent, i.e. mains-operated, hand-held power tools.

The housing 110 comprises a drive unit 111 and the percussion mechanism 122, wherein the drive unit 111 and the percussion mechanism 122 are disposed in the housing 110. The drive unit 111 further includes an electrically commutated drive motor 114, which is supplied with current by the hand-held power tool rechargeable battery pack 130, and a gear unit 118. The gear unit 118 is configured as at least one planetary gear 166, see also FIGS. 2 to 5. The drive motor 114 is designed such that it can be actuated, for example via a manual switch 128, so that the drive motor 114 can be switched on and off. The drive motor 114 can advantageously be electronically controlled and/or regulated, so that a reversing mode and a desired rotational speed can be implemented. For the reversing mode, the hand-held power tool 100 comprises a rotation direction switching element 121 configured as a rotation direction changeover switch. The rotation direction switching element 121 is configured to switch the drive motor 114 between a clockwise direction of rotation and a counterclockwise direction of rotation. The design and mode of operation of a suitable drive motor are sufficiently well-known to those skilled in the art, which is why they will not be discussed in more detail here.

The gear unit 118 is connected to the drive motor 114 via a drive shaft 116. The drive shaft 116 is mounted in the housing 110 by means of a bearing 180. The gear unit 118 is provided to convert a rotation of the drive shaft 116 into a rotation between the gear unit 118 and the percussion mechanism 122 via an intermediate shaft 120. This conversion preferably takes place in such a way that the intermediate shaft 120 rotates relative to the drive shaft 116 with increased torque, but at a reduced rotational speed, see also FIGS. 2 to 5. The intermediate shaft 120 drives the percussion mechanism 122 at least partly. The gear unit 118 comprises a gear housing 119, which is disposed in the housing 110. The hand-held power tool 100 comprises a tool axis 102, wherein here an axis of rotation of the drive shaft 116 forms the tool axis 102.

The percussion mechanism 122 is connected to the intermediate shaft 120 and comprises a striker 300 and at least one percussion mechanism spring 320 which is connected to the striker 300 in a rotationally fixed manner, wherein, during a percussive operating mode, the percussion mechanism 122 generates high-intensity impact-like rotary pulses, see also FIGS. 2-8. The intermediate shaft 120 comprises a bearing 200, see also FIG. 2-5. The percussion mechanism spring 320 is connected to the bearing 200 in a rotationally fixed manner. These impact-like rotary pulses are transmitted to the output shaft 124, for example a work spindle, via the striker 300. The percussion mechanism 122 comprises a percussion mechanism housing 123, wherein the percussion mechanism 122 can also be disposed in another suitable housing, such as the gear housing 119. The percussion mechanism 122 is configured to drive the output shaft 124. A tool holder 150 is provided on the output shaft 124. The tool holder 150 is preferably molded onto and/or configured on the output shaft 124. The tool holder 150 is preferably disposed in an axial direction 132 facing away from the drive unit 111. The tool holder 150 is configured here as a hexagon socket, in the form of a bit holder, which is provided to accommodate an insert tool 140. The insert tool is configured in the form of a screwdriver bit with a polygonal external coupling 142. The type of the screwdriver bit, for example HEX type, is sufficiently well-known to those skilled in the art. The present disclosure is not limited to the use of HEX screwdriver bits, however; other tool holders that appear useful to the those skilled in the art, such as HEX drills, SDS quick-insert tools or round-shank drill chucks, can be used as well. The design and functioning of a suitable bit holder are sufficiently well-known to those skilled in the art as well.

The hand-held power tool 100 comprises a control unit 170 at least for controlling the drive unit 111, in particular the drive motor 114. The housing 110 at least partly accommodates the control unit 170. The control unit 170 comprises a not further depicted microprocessor. The housing 110 also comprises a power supply holding device 160. The power supply holding device 160 accommodates the hand-held power tool rechargeable battery pack 130 and forms a base 162 comprising a standing surface. The hand-held power tool rechargeable battery pack 130 can be released from the power supply holding device 160 without tools. The housing 110 also comprises the handle 126 and the power supply holding device 160. The handle 126 can be grasped by the user. In one embodiment, the power supply holding device 160 is disposed on the handle 126. The hand-held power tool 100 can be set down on the base 162.

Figure 2:
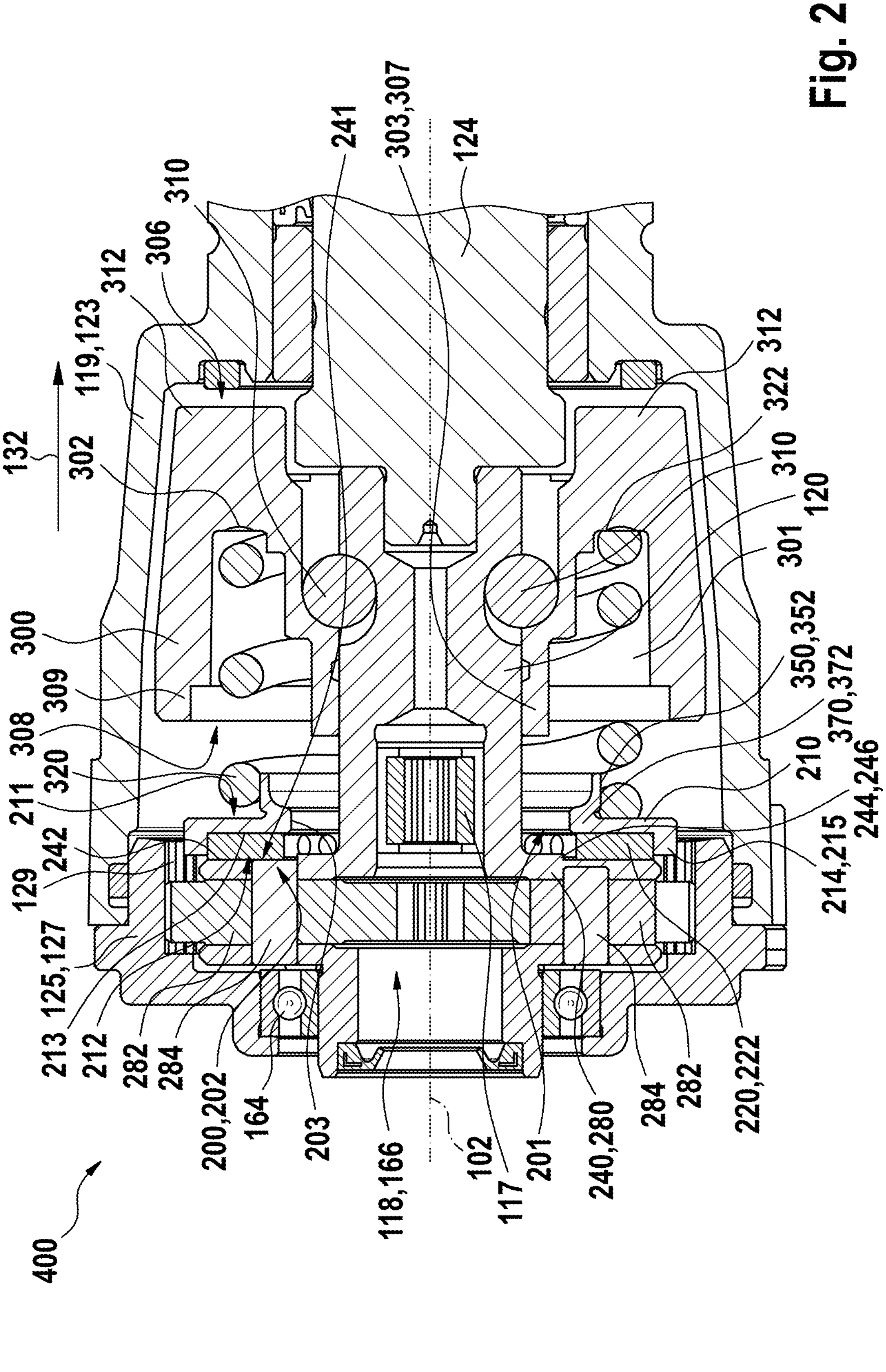
FIG. 2 a longitudinal section of a first embodiment of a percussion mechanism of the hand-held power tool.

FIG. 2 shows a longitudinal section 400 of a first embodiment of the percussion mechanism 122 of the hand-held power tool 100. The percussion mechanism 122, the intermediate shaft 120, the gear unit 118 and the output shaft 124 are shown, wherein, in this example, the intermediate shaft 120 forms part of the gear unit 118. The intermediate shaft 120 is disposed between the drive motor 114 and the tool holder 150; the drive motor 114 and the tool holder 150 are not shown here. The gear unit 118 is configured as the planetary gear 166, and a planetary gear stage is formed here as an example. In addition to the gear housing 119, the gear unit 118 comprises a gear cover 125. The gear cover 125 is provided here to at least partly close the gear unit 118 with respect to the drive motor 114. The gear cover 125 is disposed between the planetary gear 166 and the drive motor 114. The planetary gear 166 also comprises a ring gear 129, wherein the ring gear 129 and the gear cover 125 are one piece as an example. The intermediate shaft 120 comprises an intermediate shaft bearing 164. The gear cover 125 comprises a receptacle for the intermediate shaft bearing 164, so that the receptacle for the intermediate shaft bearing 164 accommodates the intermediate shaft bearing 164. The intermediate shaft bearing 164 enables the intermediate shaft 120 to be rotatable relative to the gear cover 125.

The percussion mechanism 122 is connected to the drive motor 114 by means of the planetary gear 166. The percussion mechanism 122 is configured here as a V-groove percussion mechanism, see also FIGS. 3 to 5. The percussion mechanism 122 is disposed between the drive motor 114 and the tool holder 150. The striker 300 and the percussion mechanism spring 320 are disposed in the percussion mechanism housing 123. The percussion mechanism 122 comprises a percussion mechanism cover 127, wherein the percussion mechanism cover 127 closes off the percussion mechanism 122 in the direction of the drive motor 114. The percussion mechanism cover 127 is disposed between the drive motor 114 and the planetary gear 166. In this case, the percussion mechanism cover 127 and the gear cover 125 are one piece for example, and the percussion mechanism cover 127 then forms the ring gear 129.

The striker 300 and the percussion mechanism spring 320 are disposed in circumferential direction around the intermediate shaft 129 and are connected to the striker 300 in a rotationally fixed manner. In this example, the percussion mechanism spring 320 is configured as a spiral spring. The striker 300 is mounted on the intermediate shaft 120 by means of percussion mechanism balls 310, see also FIGS. 3 to 5. The percussion mechanism balls 310 is provided to move the striker 300 at least partly in the direction of the drive motor 114. FIG. 2 shows the striker 300 in a position facing the tool holder 150. The striker 300 can also be disposed in a position facing the drive motor 114, see FIGS. 4 and 5. In the position facing the tool holder 150, the striker 300 rests against a rear end of the tool holder 150, i.e. the output shaft 124, by means of two percussion cams 312. In the position facing the drive motor 114, the striker 300 is disposed spaced apart from the tool holder 150.

The drive motor 114 comprises the drive shaft 116, wherein the drive shaft 116 is mounted in the housing 110 by means of a drive shaft bearing 117. The drive shaft 116 is not shown in FIG. 2. In this example, the drive shaft bearing 117 is configured as a needle bearing. The drive shaft bearing 117 is disposed here at an end of the drive motor 114 facing the tool holder 150. The drive shaft 116 projects into the intermediate shaft 120 through the planetary gear 166. The drive shaft bearing 117 is disposed in the intermediate shaft 120.

The percussion mechanism spring 320 can be rotated relative to the intermediate shaft 120 by means of the bearing 200. In this example, the bearing 200 is configured as a needle bearing 202. The planetary gear 166 comprises a planet carrier 280. The bearing 200 is disposed axially between the percussion mechanism spring 320 and the planet carrier 280. In addition to the planet carrier 280, the planetary gear 166 comprises a plurality of planet gears 282 and bearing bolts 284. The bearing bolts 284 are provided to rotatably connect the planet gears 282 to the planet carrier 280. The intermediate shaft 120 and the planet carrier 280 are one piece as an example.

The bearing 200 comprises a bearing race 210. The percussion mechanism spring 320 rests against the bearing race 210. The bearing 200 further comprises rolling elements 220. The bearing race 210 is disposed in the percussion mechanism housing 123 in the direction toward the tool holder 150. The bearing race 210 is disposed axially between the rolling elements 220 and the percussion mechanism spring 320. In this example, the bearing race 210 is substantially disk-shaped, as a kind of disk. The rolling elements 220 are configured as needles 222 in this example. The bearing race 210 has a side 211 facing the percussion mechanism spring 320 and a side 212 facing the drive motor 114. The side 211 of the bearing race 210 facing the percussion mechanism spring 320 is substantially flat here as an example. The side 212 of the bearing race 210 facing the drive motor 114 comprises a rolling element holder 213. The rolling element holder 213 is provided to accommodate and support the rolling elements 220 of the bearing 200. In this example, the rolling element holder 213 is configured to be one piece with the bearing race 210 and is substantially flat.

The bearing 200 comprises a fastening element 350. The fastening element 350 is provided to connect the percussion mechanism spring 320 to the bearing 200 in a rotationally fixed manner. The bearing 200, in particular the bearing race 210, forms the fastening element 350 here, so that they are one piece. In this example, the fastening element 350 is disposed in a radial direction between the intermediate shaft 120 and the percussion mechanism spring 320. The percussion mechanism spring 320 rests against the fastening element 350 and forms a press connection. The fastening element 350 is configured as a circumferential web 352, for example. The percussion mechanism spring 320 has an inner perimeter and an outer perimeter. In this example, the percussion mechanism spring 320 rests against the fastening element 350 via the inner perimeter. The fastening element 350 engages in the inner perimeter of the percussion mechanism spring 320.

The bearing 200 also comprises a stabilizing element 370. The stabilizing element 370 is provided to connect the fastening element 350 to the bearing race 210. The stabilizing element 370 is disposed axially between the bearing race 210 and the fastening element 350. The stabilizing element 370 is disposed as a kind of arch 372 between the fastening element 370 and the bearing race 210, for example. The bearing race 210 forms the stabilizing element 370 and the fastening element 350 here, for example, so that they are one piece.

The planet carrier 280 of the planetary gear 166 is configured at least partly as a bearing cover disk 240 of the bearing 200, wherein the planet carrier 280 and the bearing cover disk 240 are one piece. In addition to the bearing race 210, the bearing 200 comprises the rolling elements 220 and the bearing cover disk 240. The bearing cover disk 240 is disposed here opposite the bearing race 210. The rolling elements 220 are disposed, in particular axially, between the bearing race 210 and the bearing cover disk 240. The bearing cover disk 240 is also disposed in the percussion mechanism housing 123 in the direction toward the drive motor 114. The bearing cover disk 240 has a side 241 facing the tool holder 150, wherein the side 241 of the bearing cover disk 240 facing the tool holder 150 is disposed opposite the side 212 of the bearing race 210 facing the drive motor 114. The side 241 of the bearing cover disk 240 facing the tool holder 150 also comprises a further rolling element holder 242, wherein the further rolling element holder 242 is provided to accommodate and support the rolling elements 220. The rolling elements 220 can be accommodated and supported by the rolling element holder 213 of the bearing race 210 and the further rolling element holder 242 of the bearing cover disk 240. The bearing race 210 can be rotated relative to the bearing cover disk 240. The further rolling element holder 242 is shaped complementarily to the rolling elements 220 and accommodates the rolling elements 220 in a form-locking manner, for example, wherein the further rolling element holder 242 is one piece with the bearing cover disk 240 in this example. The further rolling element holder 242 is substantially flat, for example. The rolling element holder 213 and the further rolling element holder 242 are configured in the same way.

The bearing 200, in particular the bearing race 210, comprises a centering element 214. The centering element 214 is provided to center the bearing 200 relative to the intermediate shaft 120. The bearing race 210 forms the centering element 214 here, so that they are one piece. The centering element 214 is provided to center and align the rolling elements 220 relative to the intermediate shaft 120. In this example, the centering element 214 is configured as an at least partly circumferential web 215. The centering element 214 at least partly surrounds the rolling elements 220 in axial direction. The centering element 214 is configured on an inner perimeter 201 of the bearing 200, wherein the centering element 214 is then disposed radially between the tool axis 102 and the rolling elements 220. The fastening element 350 and the centering element 214 are disposed and formed opposite to one another on the bearing race 210. The fastening element 350 is disposed on the inner perimeter 201 of the bearing 200 here, and the centering element 214 is disposed on an outer perimeter of the bearing 200.

The bearing 200, in particular the bearing cover disk 240, comprises at least one retaining element 244. The retaining element 244 is provided to radially restrain the rolling elements 220. The bearing cover disk 240 forms the retaining element 244, so that they are one piece. Thus the planet carrier 280 forms the retaining element 244 in this example. The retaining element 244 is configured as a circumferential step 245, for instance. The retaining element 244 is disposed radially between the rolling elements 220 and the tool axis 102. The rolling elements 220 are disposed radially between the retaining element 244 and the centering element 214.

The striker 300 comprises a spring receptacle 302. The percussion mechanism spring 320 comprises a connecting element 322. The spring receptacle 302 is provided to at least receive the connecting element 322 in a form-locking manner and connect it to the striker 300 in a rotationally fixed manner. The striker 300 has a free end 306 directed in the direction of the tool holder 150 and a free end 308 directed in the direction of the drive motor 114. The percussion cams 312 are configured on the free end 306 directed in the direction of the tool holder 150, see also FIGS. 3 to 5. The percussion mechanism spring 320 is disposed on the free end 308 of the striker directed in the direction of the drive motor 114. On the free end 308 directed in the direction of the drive motor 114, the striker 300 has an inner perimeter 301. The spring receptacle 302 is formed on the inner perimeter 301 of the free end 308 directed in the direction of the drive motor 114. The spring receptacle 302 is disposed on the striker 300 in circumferential direction and axially to the percussion cams 312. In this example, the striker 300 forms the spring receptacle 302, so that they are one piece. As an example, the spring receptacle 302 is configured here as a cylindrical opening, see FIGS. 3 to 9.

The percussion mechanism spring 320 forms the connecting element 322, for example, so that they are one piece. The connecting element 322 is configured as a pin-like insertion end on a free end of the percussion mechanism spring 320 in the direction toward the tool holder 150, see FIGS. 3 to 9. In this example, the connecting element 322 and the spring receptacle 302 are connected to one another in a form-locking manner. The spring receptacle 302 is formed in the striker 300 axially along the intermediate shaft 120, so that it is aligned axially along the tool axis 102.

The striker 300 comprises a guide element 303. The bearing 200, in particular the bearing race 210, comprises a guide opening 203. The guide element 303 is provided to engage through the guide opening 203. The striker 300 forms the guide element 303 here, so that they are one piece. The guide element 303 is also provided to guide the striker 300 on the intermediate shaft 120 at least during the percussive operating mode. The guide element 303 is disposed at least partly in circumferential direction around the intermediate shaft 120. The guide element 303 is configured as a sleeve in this example. The bearing race 210 forms the guide opening 203 here, wherein the guide opening 203 configured as a circular central opening in the bearing 200. The rolling elements 220 can be moved in circumferential direction around the guide opening 203.

The striker 300 comprises a projecting element 309. The projecting element is provided to project at least partly beyond the bearing 200, in particular the bearing race 210, very particularly the bearing race 210 and the rolling elements 200. In this case, the striker 300 forms the projecting element 309, so that they are one piece. The projecting element 309 is configured as an at least partly circumferential step, for example. The projecting element 309 projects beyond the bearing 200, in particular the bearing race 210, when the striker 300 is disposed in the position facing the drive motor 114.

Figure 3:
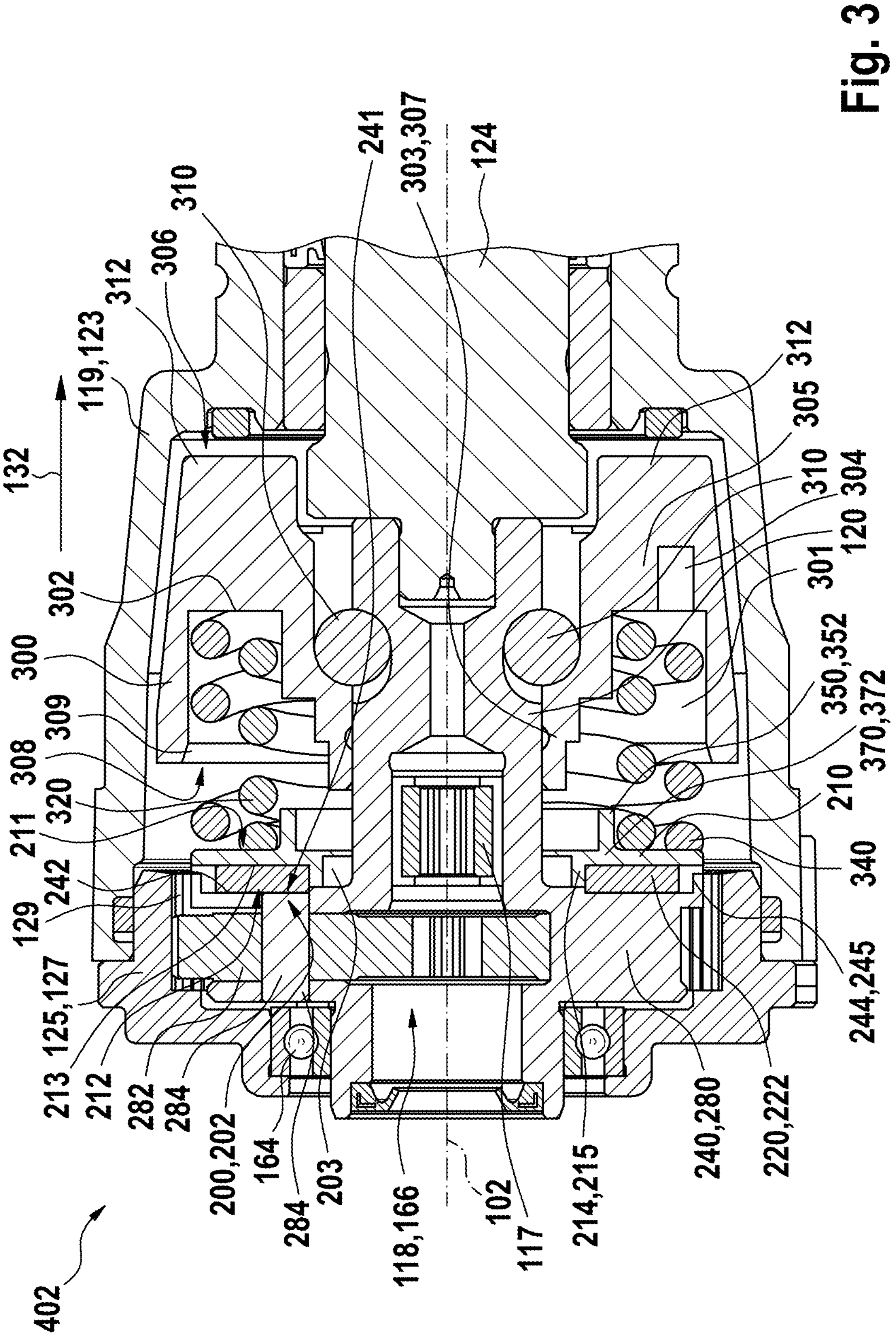
FIG. 3 a longitudinal section of a second embodiment of a percussion mechanism of the hand-held power tool.

FIG. 3 shows a longitudinal section 402 of a second embodiment of the percussion mechanism 122 of the hand-held power tool 100. FIG. 3 shows the striker 300 in the position facing the tool holder 150. The fastening element 350 is disposed here on the inner perimeter 201 of the bearing 200, and the centering element 214 is disposed on an inner perimeter 201 of the bearing 200. The retaining element 244 is configured here as an at least partly circumferential web 245, for example. The retaining element 244 is disposed radially between the rolling elements 220 and the percussion mechanism housing 123.

The percussion mechanism 122 comprises a further percussion mechanism spring 340 here, wherein the further percussion mechanism spring 340 is connected to the striker 300 in a rotationally fixed manner. The further percussion mechanism spring 340 is configured as a spiral spring in this example. The further percussion mechanism spring 340 also rests against the bearing 200, wherein the fastening element 350 engages in the inner perimeter of the percussion mechanism spring 320. The percussion mechanism spring 320 has an outer perimeter, wherein the percussion mechanism spring 320 receives the further percussion mechanism spring 340 on the outer perimeter, so that the further percussion mechanism spring 340 at least partly encloses the percussion mechanism spring 320. The percussion mechanism spring 320 and the further percussion mechanism spring 340 are then disposed substantially concentrically in the percussion mechanism 122 along the tool axis 102. The percussion mechanism spring 320 and the further percussion mechanism spring 340 are disposed in the percussion mechanism housing 123 in circumferential direction to the intermediate shaft 120. The percussion mechanism spring 320 has a winding direction and the further percussion mechanism spring 340 has a further winding direction. The winding direction is wound to the right and the further winding direction is wound to the left, for example.

The further percussion mechanism spring 340 can also be rotated relative to the intermediate shaft 120 by means of the bearing 200. The bearing 200 is disposed axially between the further percussion mechanism spring 340 and the planet carrier 280. The bearing race 210 is disposed axially between the rolling elements 220 and the further percussion mechanism spring 340.

The striker 300 comprises a further spring receptacle 304. The spring receptacle 302 and the further spring receptacle 304 are configured substantially concentric to one another in the striker 300, wherein the spring receptacle 302 and the further spring receptacle 304 are configured next to one another in radial direction from the tool axis 102, see also FIGS. 6 to 9. The spring receptacle 302 and the further spring receptacle 304 are separated from one another here by means of a web 305, see also FIGS. 6 to 9. The further percussion mechanism spring 340 comprises a further connecting element 342. The further spring receptacle 304 is provided to at least receive the further connecting element 342 in a form-locking manner and connect it to the striker 300 in a rotationally fixed manner. The further percussion mechanism spring 340 is also disposed on the free end 308 of the striker directed in the direction of the drive motor 114. The further spring receptacle 304, too, is formed on the inner perimeter 301 of the free end 308 directed in the direction of the drive motor 114. The spring receptacle 302 and the further spring receptacle 304 are disposed on the striker 300 in circumferential direction and axially to the percussion cams 312, see also FIGS. 6 to 9. In this example, the striker 300 also forms the further spring receptacle 304, so that they are one piece. The further spring receptacle 304 is formed as a cylindrical opening, for example.

The further percussion mechanism spring 340 forms the further connecting element 342, for example, so that they are each one piece. The further connecting element 342 is configured as a pin-like insertion end on a free end of the further percussion mechanism spring 340 in the direction toward the tool holder 150. In this example, the further connecting element 342 is connected to the further spring receptacle 304 in a form-locking manner. The further spring receptacle 304 is formed in the striker 300 axially along the intermediate shaft 120, so that they are aligned axially along the tool axis 102. The spring receptacle 302 and the further spring receptacle 304 are configured substantially parallel and radially offset to the intermediate shaft 120 in the striker 300, see also FIGS. 6 to 9.

Figure 4:
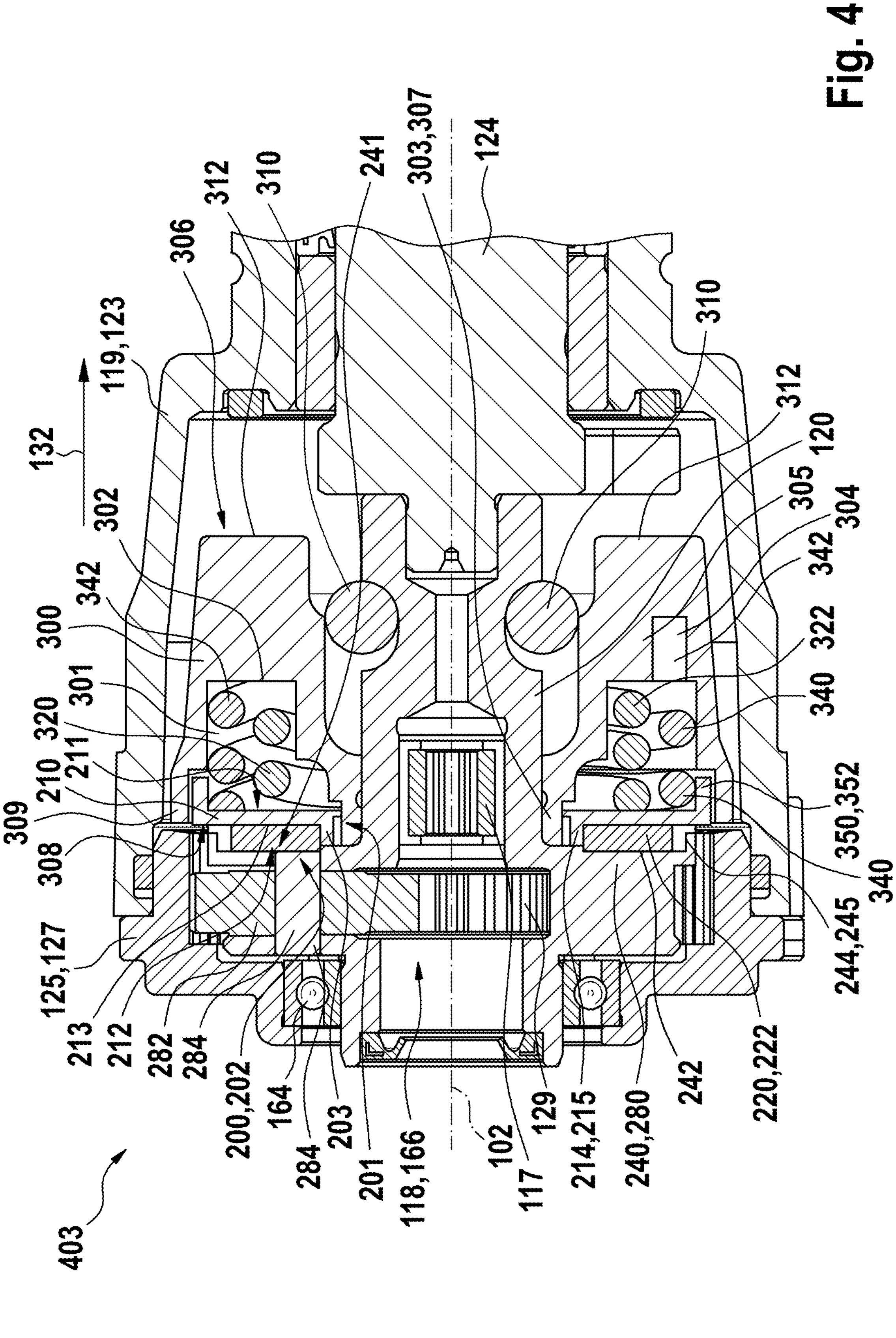
FIG. 4 a longitudinal section of a third embodiment of a percussion mechanism of the hand-held power tool.

FIG. 4 shows a longitudinal section 403 of a third embodiment of the percussion mechanism 122 of the hand-held power tool 100. The striker 300 is shown in the position facing the drive motor 114. The fastening element 350 is configured here on the outer perimeter of the bearing 200, and the centering element 214 is configured on the inner perimeter 201 of the bearing 200. The fastening element 350 rests against an outer perimeter of the further percussion mechanism spring 340 here and forms a press connection with it. The fastening element 350 is moreover one piece with the bearing race 210.

Figure 5:
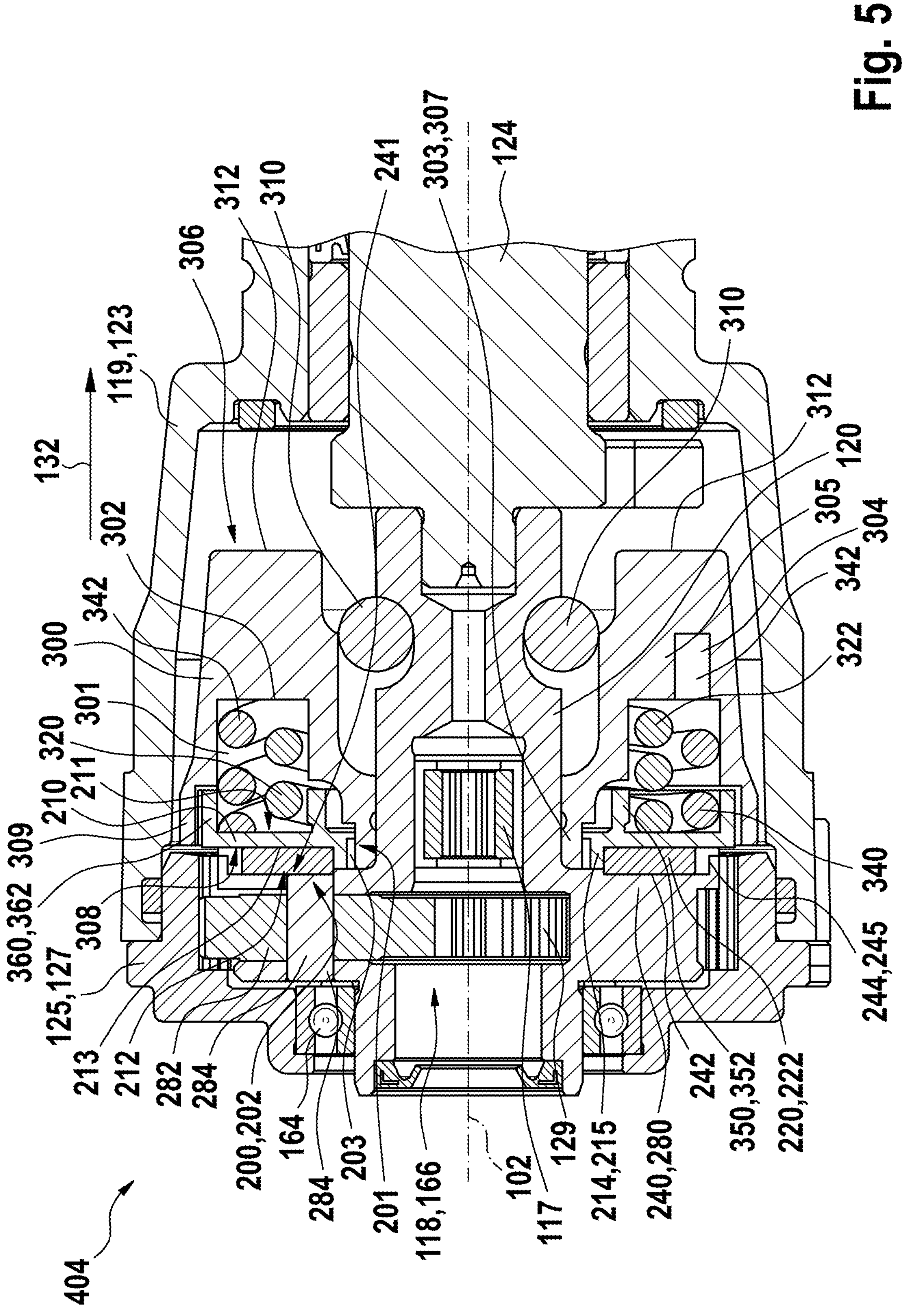
FIG. 5 a longitudinal section of a fourth embodiment of the percussion mechanism of the hand-held power tool.

FIG. 5 shows a longitudinal section 404 of a fourth embodiment of the percussion mechanism 122 of the hand-held power tool 100. The striker 300 is shown in the position facing the drive motor 114. The bearing 200 comprises a further fastening element 360. The bearing race 210 forms the fastening element 350, the further fastening element 360, and the centering element 214. The fastening element 350 and the further fastening element 360 are each formed as a circumferential web 352, 362. The centering element 214 is formed on the inner perimeter 201 of the bearing as a circumferential web 215. The fastening element 350 engages in the inner perimeter of the percussion mechanism spring 320 and forms a press connection with it. The further fastening element 360 surrounds the outer periphery of the further percussion mechanism spring 340 and forms a press connection with it. The retaining element 244 is formed here as the circumferential web 245.

Figure 6A:
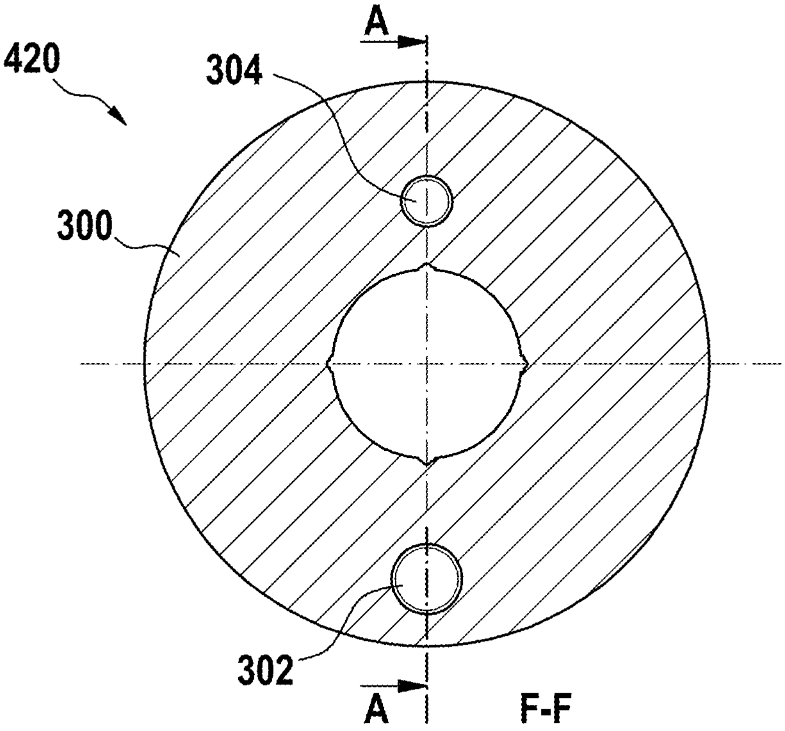
FIG. 6 sectional views of a first embodiment of a rotationally fixed connection between a percussion mechanism spring and a striker.
Figure 6B:
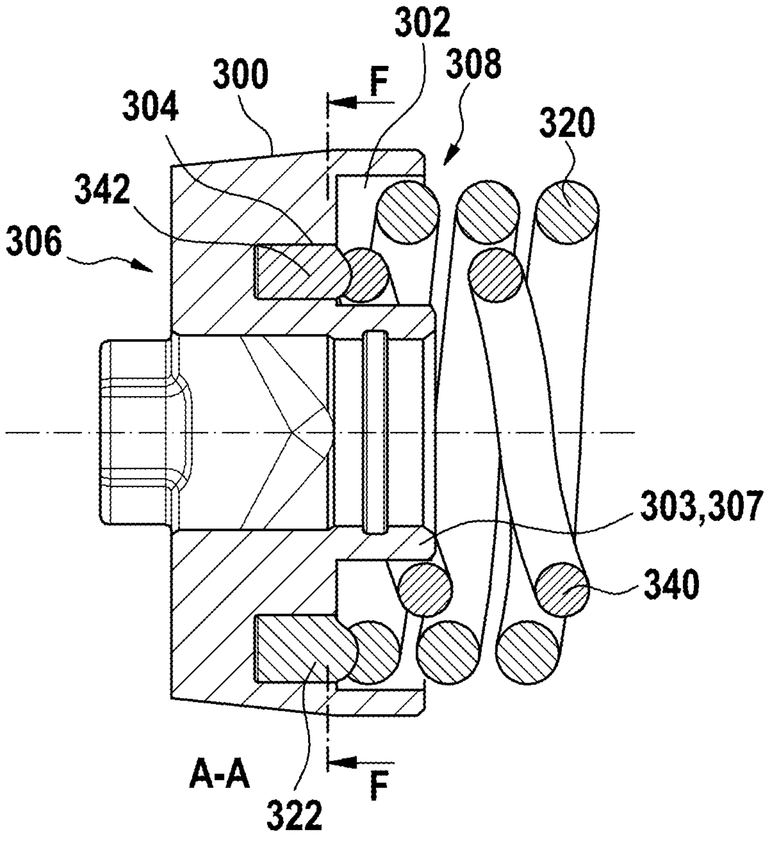

FIG. 6 shows sectional views 420 of a first embodiment of a rotationally fixed connection between the percussion mechanism spring 320 and the striker 300, in which the further percussion mechanism spring 340 is shown as well. FIG. 6*a* shows a cross-sectional view and FIG. 6*b* shows a longitudinal sectional view of the first embodiment of the rotationally fixed connection. The spring receptacle 302 and the further spring receptacle 304 are configured offset to one another in circumferential direction, for example in an angular range of substantially 180°. The spring receptacle 302 and the further spring receptacle 304 are each formed as a cylindrical opening and are both configured substantially axially and parallel to the tool axis 102. The connecting element 322 is configured here as a pin-like insertion end and is connected to the spring receptacle 302 in a form-locking manner. The further connecting element 342 is configured here as a pin-like insertion end here and is connected to the further spring receptacle 304 in a form-locking manner. The spring receptacle 302 and the further spring receptacle 304 are each formed in the striker 300 axially along the tool axis 102.

Figure 7A:
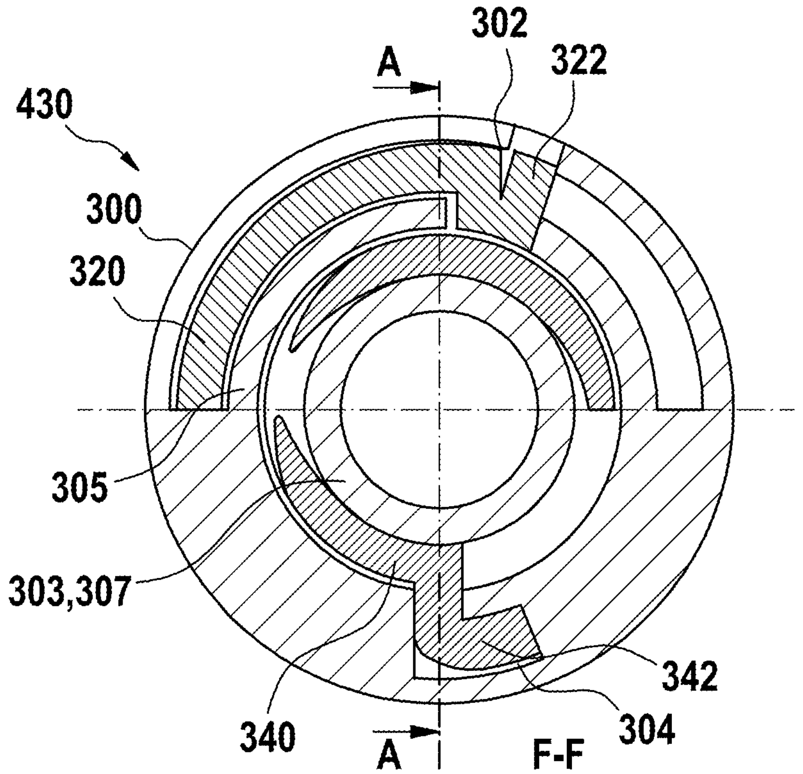
FIG. 7 sectional views of a second embodiment of a rotationally fixed connection between the percussion mechanism spring and the striker.
Figure 7B:
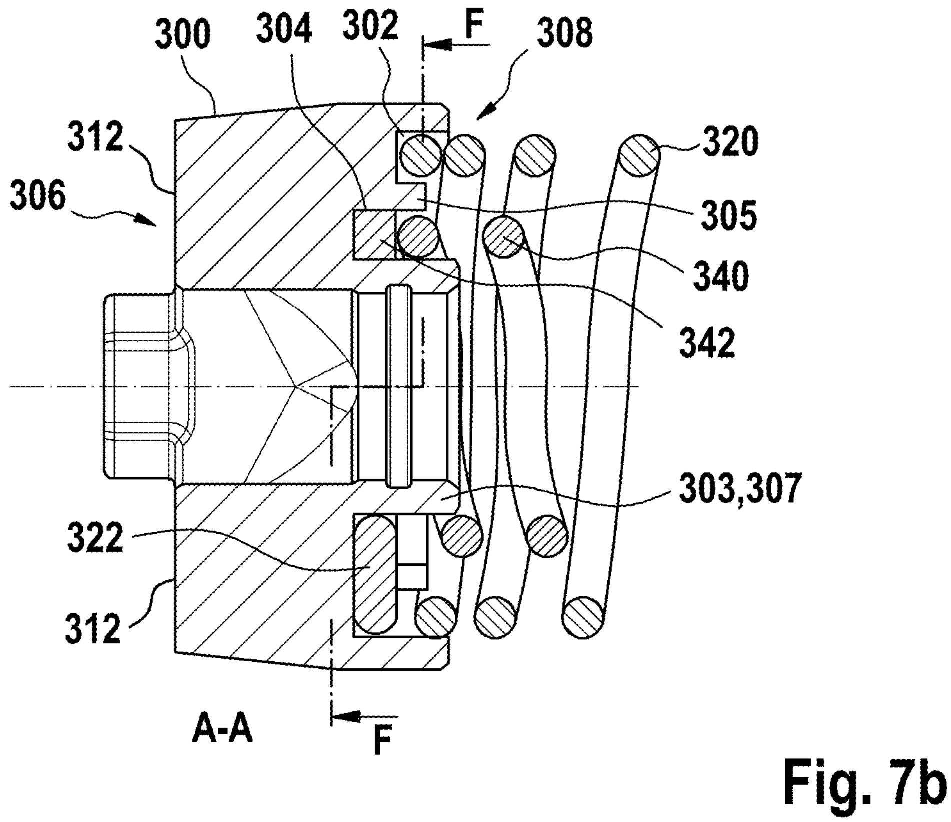

FIG. 7 shows sectional views 430 of a second embodiment of a rotationally fixed connection between the percussion mechanism spring 320 and the further percussion mechanism spring 340 and the striker 300. FIG. 7*a* shows a cross-sectional view and FIG. 7*b* shows a longitudinal sectional view of the second embodiment of the rotationally fixed connection. The spring receptacle 302 and the further spring receptacle 304 are configured offset to one another in circumferential direction. The spring receptacle 302 is configured as a polygonal opening in this example, and the further spring receptacle 304 is configured as a Z-shaped opening. The connecting element 322 is configured here as a V-shaped leg and is connected to the spring receptacle 302 in a form-locking manner. The further connecting element 342 is configured here as a Z-shaped leg and connected to the further spring receptacle 304 in a form-locking manner. The spring receptacle 302 and the further spring receptacle 304 are each configured in the striker 300 transverse to the tool axis 102.

Figure 8A:
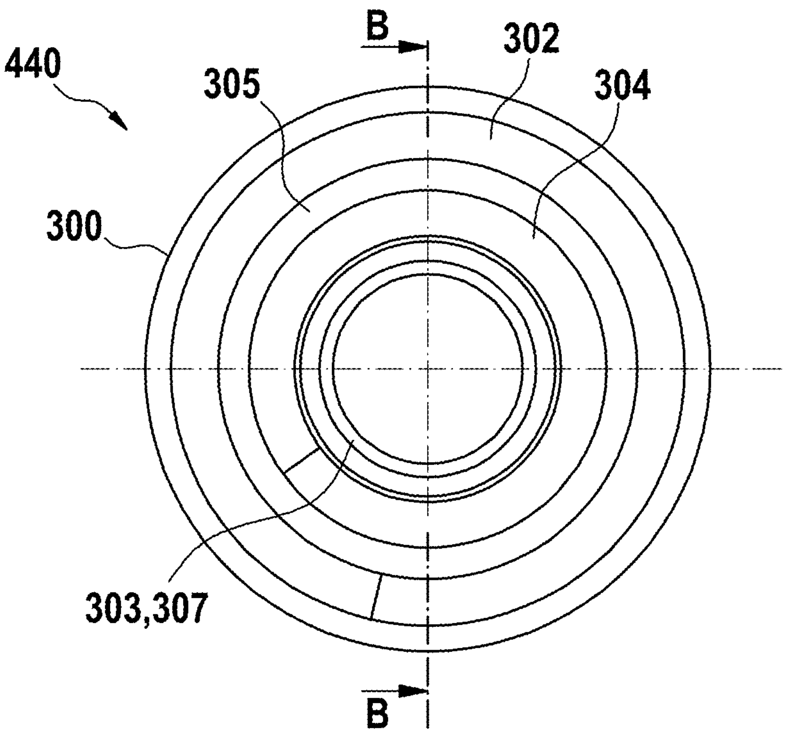
FIG. 8 sectional views of a third embodiment of a rotationally fixed connection between the percussion mechanism spring and the striker.
Figure 8B:
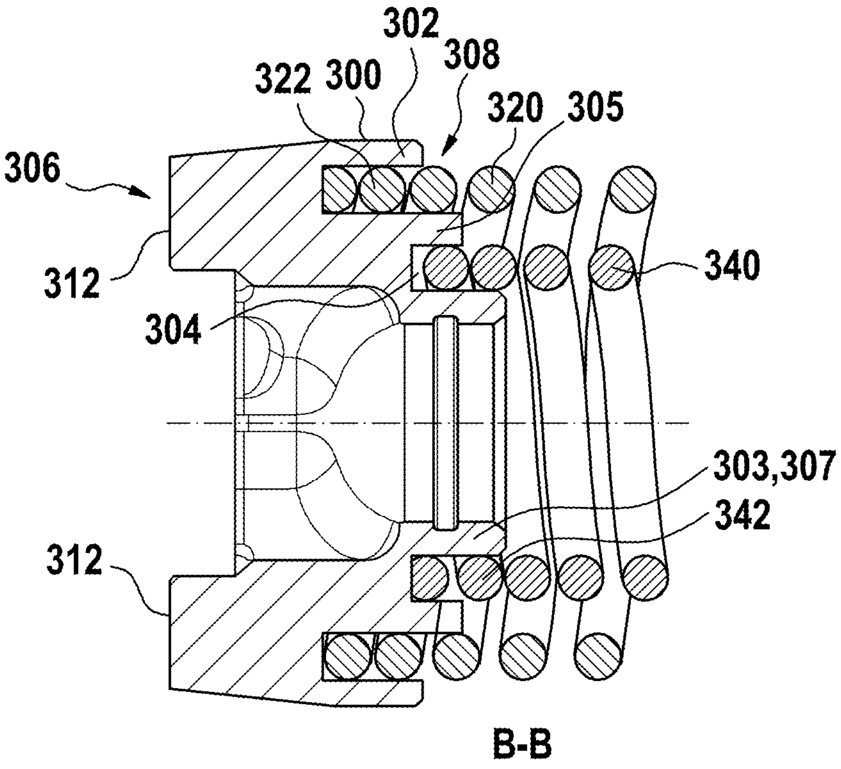

FIG. 8 shows sectional views 440 of a third embodiment of a rotationally fixed connection between the percussion mechanism spring 320 and the further percussion mechanism spring 340 and the striker 300. FIG. 8*a* shows a cross-sectional view and FIG. 8*b* shows a longitudinal sectional view of the third embodiment of the rotationally fixed connection. The spring receptacle 302 and the further spring receptacle 304 are configured offset to one another in circumferential direction. The spring receptacle 302 and the further spring receptacle 304 are both configured as a ring-shaped groove, for example. The connecting element 322 is configured here as a ring-shaped spring end and is connected to the spring receptacle 302 by means of a press fit. The further connecting element 342 is configured here as a ring-shaped spring end and is connected to the further spring receptacle 304 by means of a press fit. The spring receptacle 302 and the further spring receptacle 304 are each configured in the striker 300 transverse to the tool axis 102.

Figure 9A:
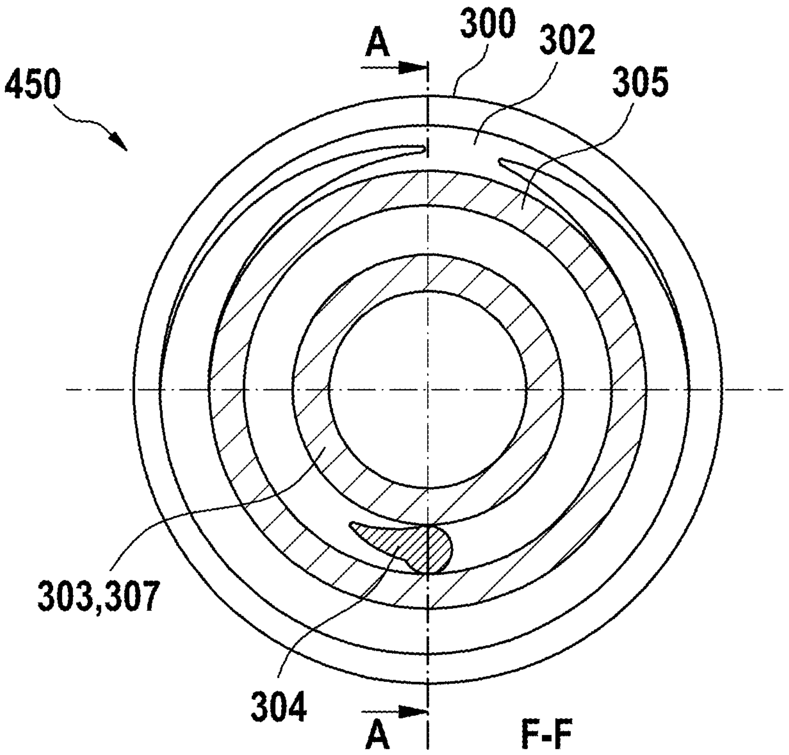
FIG. 9 sectional views of a fourth embodiment of a rotationally fixed connection between the percussion mechanism spring and the striker.
Figure 9B:
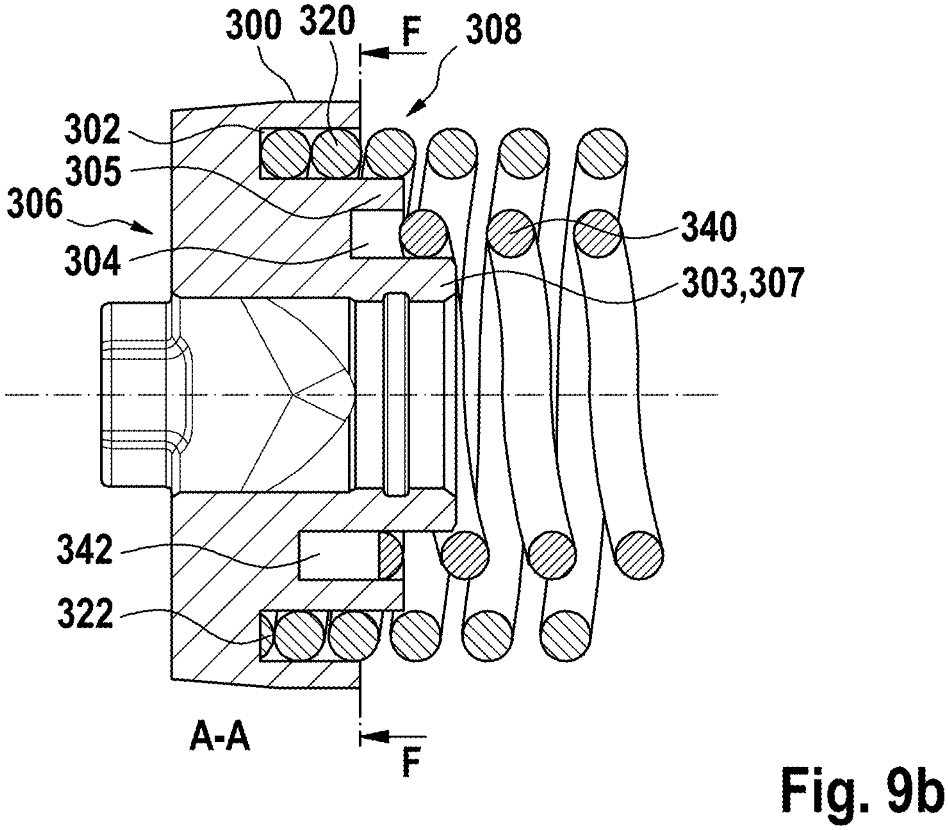

FIG. 9 shows sectional views 450 of a fourth embodiment of a rotationally fixed connection between the percussion mechanism spring 320 and the further percussion mechanism spring 340 and the striker 300. FIG. 9*a* shows a cross-sectional view and FIG. 9*b* shows a longitudinal sectional view of the fourth embodiment of the rotationally fixed connection. The spring receptacle 302 and the further spring receptacle 304 are configured offset to one another in circumferential direction. In this example, the spring receptacle 302 is configured as a ring-shaped groove and the further spring receptacle 304 is configured as a cylindrical opening. The connecting element 322 is configured here as a ring-shaped spring end and is connected to the spring receptacle 302 by means of a press fit. The further connecting element 342 is configured here as a pin-like insertion end here and is connected to the further spring receptacle 304 in a form-locking manner. In this case, the spring receptacle 302 is configured in the striker 300 transverse to the tool axis 102 and the further spring receptacle 304 along the tool axis 102.

The invention claimed is:

1. A hand-held power tool comprising:

a housing;

a drive motor;

an intermediate shaft driven by the drive motor;

a percussion mechanism comprising a striker and at least one percussion mechanism spring which is connected and rotationally-fixed to the striker, the percussion mechanism configured to be driven at least in part by the intermediate shaft; and a tool holder configured to receive an insert tool, the tool holder configured to be driven by the percussion mechanism, wherein the intermediate shaft comprises at least one bearing that includes a fastening element with a circumferential web surrounding the intermediate shaft, wherein the percussion mechanism spring includes a circumferential perimeter surrounding the intermediate shaft, and wherein the circumferential perimeter of the percussion mechanism spring forms a press-fit connection with said circumferential web of the fastening element of the bearing in a rotationally fixed manner.

2. The hand-held power tool according to claim 1, wherein the intermediate shaft further comprises at least one planet carrier, and the bearing is disposed between the percussion mechanism spring and the planet carrier.

3. The hand-held power tool according to claim 1, wherein the bearing comprises at least one stabilizing element configured to connect the fastening element to the bearing.

4. The hand-held power tool according to claim 1, wherein the circumferential web is incorporated in a bearing race of the bearing.

5. The hand-held power tool according to claim 1, wherein the bearing comprises at least one centering element configured to center the bearing relative to the intermediate shaft.

6. The hand-held power tool according to claim 1, wherein the bearing comprises at least one retaining element configured to restrain rolling elements of the bearing.

7. The hand-held power tool according to claim 1, wherein the percussion mechanism further comprises at least one further percussion mechanism spring.

8. The hand-held power tool according to claim 1, wherein:

the striker comprises a guide element, the bearing comprises a guide opening, and the guide element is configured to engage through the guide opening.

9. The hand-held power tool according to claim 1, wherein the striker comprises a projecting element that projects at least partly beyond the bearing.

10. The hand-held power tool according to claim 1, wherein the tool holder is driven by at least one of the striker and the intermediate shaft.

11. The hand-held power tool according to claim 3, wherein the at least one stabilizing element is configured to connect the fastening element to a bearing race of the bearing.

12. The hand-held power tool according to claim 1, wherein:

said circumferential perimeter of said percussion mechanism spring is an inner perimeter; and said circumferential web of said fastening element is disposed radially between said intermediate shaft and said percussion mechanism spring with said inner perimeter in press-fit connection with said circumferential web.

13. The hand-held power tool according to claim 1, wherein:

said circumferential perimeter of said percussion mechanism spring is an outer perimeter; and said percussion mechanism spring is disposed radially between said circumferential web of said fastening element and said intermediate shaft with said outer perimeter in press-fit connection with said circumferential web.

* * * * *